United States Patent Office 3,180,880
Patented Apr. 27, 1965

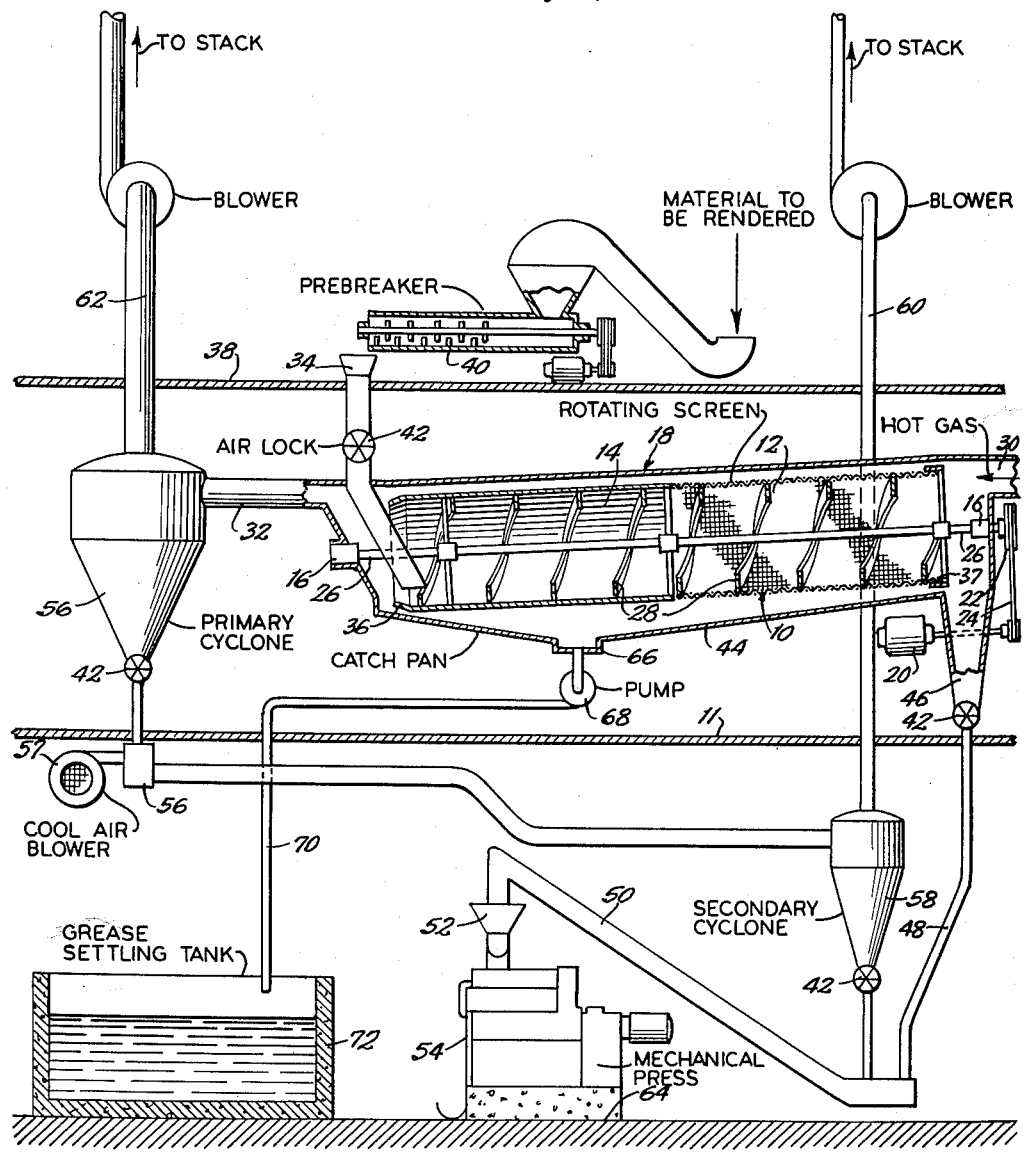

3,180,880
METHOD OF RENDERING FATTY MATERIALS
John R. Harrison and Merlin J. Andera, Waterloo, Iowa, assignors to The Rath Packing Company, Waterloo, Iowa, a corporation of Iowa
Filed May 31, 1960, Ser. No. 32,954
3 Claims. (Cl. 260—412.6)

This invention relates to an improved continuous method and apparatus for rendering fatty materials to produce lard and tallow. Heretofore animal fats have been rendered in an open kettle, in open steam or by dry rendering in a closed heated vessel either under pressure or vacuum. Each of these methods is objectionable for one reason or another. In open kettle rendering, where the comminuted fatty tissue is agitated for several hours in a steam jacketed kettle until the fat is melted and the cracklings dried, the yield is very poor since the cracklings retain much residual fat. This method is only useful for materials with large percentages of fat.

In steam rendering, where the fat cuts are subjected directly to injected steam, the yield is better but the time required to effect the separation of the fat and recover the protein mateiral is very long, usually requiring six hours or more. The tank bottoms must be worked up by evaporation and other means to recover the protein and residual fat from the original water and condensed steam.

In dry rendering the free fat is drained from the solid material after heating under vacuum for a sufficient period of time to remove all free moisture in the fatty material. The remaining solid material is pressed to remove most of the remaining fat so that the yield is good. However, the process is time consuming and is essentially a batch process.

More recently continuous processes have been proposed for edible rendering. Such processes typically include the steps of grinding the fatty material to chunk size, grinding it again to a very fine creamy consistency, heating under vacuum, centrifuging to separate the melted fat from the protein solids, and centrifuging the separated fat again to remove water and residual solids. By carrying out the first stages of the heating step at low temperature it has been possible to use the protein solids in sausage formulations. Such continuous processess have considerable value for rendering materials which are rich in fat content but are not suitable for rendering low fat content products which cannot readily be comminuted to a semi-liquid. Consequently, they are not applicable to inedible rendering in which case the fat content of the feed material is substantially lower. Furthermore, the centrifuging apparatus required to practice this process is very expensive in consideration of the value of the yield of fat.

The primary object of the present invention is to obviate the objections to these prior methods of rendering and provide a process (1) which can be conducted continuously in a very short time on a low-fat feed material and (2) which produces a high yield of quality fat and protein at relatively low cost.

Another object is to provide a rugged, inexpensive apparatus particularly adapted for carrying out this process.

A further object of the invention is to provide an improved process in which the fatty material is subjected to coarse grinding only, thus eliminating the necessity of employing high speed, precision machinery which is expensive to purchase and maintain.

An additional object is to provide means and method for effecting separation of fat from solid protein by simultaneous heating and drying, specifically by contacting the subdivided material with hot inert gas.

The method of the invention comprises essentially expoing the ground fatty material to a current of hot non-condensable gas such as hot combustion gas, and quickly removing the separated molten fat from the remaining solids as it is formed. Direct contact with hot gas permits raising the temperature quickly and to a higher point without adversely affecting the quality of the recovered products. Air may be used as the gaseous heat source because the time of exposure is so short that any oxidation which does occur does not seriously affect the quality of the fat. Preferably, however, combustion gas which contains a minimum of oxygen is employed. Both air and combustion gases are non-condensable. Upon subjection to such gas having a temperature of 350–400° F., the fat in the fatty material melts and separates from the crackling proteins and fibers. Moisture is carried away in the gas stream to dry the fibrous solids and minimize any opportunity for hydrolysis of the fat. Some of the moisture in the fat appears to be absorbed by the protein during heating. The molten fat is removed from the mass almost as soon as it separates so that it is not subjected to prolonged heating. This not only improves the quality of the fat but reduces the heat requirement for the process. The protein or fibrous portion is subjected to continued contact with the hot gas until its temperature reaches 250–300° F. It is essential that the protein be "denatured" which term, in this specification and in the appended claims, means that the protein has been heated to such temperature that it becomes coagulated to the extent that it can be mechanically pressed. In other words, it is completely in the solid state. The process of the invention is well adapted for continuous operation by conveying the ground fatty material countercurrent to the flow of hot gas. The total time of exposure will range from 15 to 30 minutes. The denatured fibrous material is pressed to extract residual fat after discharge from the conveyor.

The drawing, which consists of a single figure, is a semi-diagrammatic illustration of apparatus useful for practicing the process of the invention. The rendering process takes place in the rotary cylinder 10 which has one portion of its side wall 12 perforated and another portion of its side wall 14 imperforate. The cylinder is mounted on trunnions 16 which are supported by the frame of a shell member 18 which completely encloses the cylinder 10. The cylinder may be tilted slightly so that the left end is lower for purposes mentioned below. Means for rotating the cylinder is supplied, as for example, a motor 20 which drives a gear 22 through a chain 24 or the like. The gear 22 is mounted on the end of the main shaft 26 which extends through the end wall of the shell 18 at the right-hand side of the drawing. A suitable continuous helix 28 is mounted on the wall of cylinder 10 along the length thereof for advancing ground-up fatty material from one end of the cylinder to the other. Individual flights secured to the inside of the cylinder may be employed in place of the screw, if desired. Conduit 30 connects to the right end of the shell 18 near the top for introducing hot combustion gas from any suitable source, not shown. The gas may be generated by burning natural gas, propane, butane or the like in a controlled atmosphere so that all of the hydrocarbon is converted to carbon oxides. By including only the amount of oxygen required for combustion, the combustion gas will contain a minimum amount of oxygen.

A gas discharge duct 32 connects to the left end of the shell 18 for carrying off the combustion gas which has traversed the length of the cylinder. A suitable conduit 34 extends upwardly through the shell and angles at its lower end into the open end 36 of the cylinder 10. The upper end of conduit 34 rises above a platform 38 which supports a pre-breaker 40 such as a Reitz Prebreaker. This is a standard piece of apparatus used in the meat packing industry and is suitable for grinding materials which contain bones and fibers. Material discharged from the pre-breaker is about one inch longest dimension. A suitable gas lock 42 is disposed within the conduit 34 so that ground material from the pre-breaker can be introduced into the cylinder 10 without any substantial loss of gas. The air lock is adapted to rotate like a revolving door to discharge material from its triangular shaped pockets while maintaining a seal with the surrounding housing.

The cylinder 10 is divided into the imperforate portion 14 and perforate portion 12 at approximately its mid length. The imperforate portion prevents water from being carried off with the fat. By the time the fatty material reaches the perforate portion 12 the moisture has been carried away in the gas stream or absorbed by the protein. The shell 18 has a bottom 44 which slopes from both ends to a sump 66 for catching molten fat which passes through the perforations in the perforated portion 12 of the cylinder 10. The shell 18 terminates at its right end at the bottom in a funnel-like discharge conduit 46 adapted to receive cracklings and spent solid material which is discharged continuously from the end 37 of the rotating cylinder 10. The discharge conduit 46 also contains a gas lock 42 so that hot gas entering the shell 18 through the conduit 30 does not escape with the solid material. Conduit 46 leads through chute 48 to a conveyor 50 which lifts the solid material to the hopper 52 of a mechanical press 54 for extracting any fat remaining in the solid material. The press is adapted to operate in a continuous fashion. An "Anderson Expeller" is suitable for this job.

The outlet duct 32 connects to a separator such as a cyclone 56 which serves to separate any lightweight entrained solids picked up by the gas stream as it passes through the rotating cylinder 10. The gas is discharged through duct 62 to the stack. The solid particles fall to the bottom of the cyclone and are discharged through the gas lock 42 into a horizontal duct 56 which is equipped with an air blower 57 for conveying the lightweight solids into a second cyclone or similar separator 58. The solids are discharged from the bottom of the cyclone 58 through another gas lock 42 and fall onto the conveyor 50 which carries them to the mechanical press 54 together with the solid material which has been discharged from the end of the cylinder 10. The air escapes from the second cyclone through the pipe 60 to the stack.

It will be noted that the mechanical press 54 is supported by floor 64 spaced below the floor 11 on which the rotating cylinder is supported. The liquid fat separated from the solid material by means of the perforated wall 12 is collected in sump 66 from which it is pumped by the pump 68 through pipe 70 to a grease settling tank 72 in which the fat is cooled.

The following representative example will illustrate how the apparatus is operated to practice the process of the invention. A typical composition of inedible material which may be rendered in accordance with this process is the following (obtained from the slaughter of hogs):

| | Percent |
|---|---|
| Skulls and jaw bones | 36.8 |
| Hind feet | 18.0 |
| Livers, gullets, spleens, ears | 21.2 |
| Blood clots | 24.0 |

The bone carrying materials are reduced to about one inch longest dimension in the Reitz Prebreaker 40. Those parts which do not contain bones may be subdivided in a meat grinder. The group-up mixture is fed into the conduit 34 at a rate of about 1000 pounds per hour. The material passes continuously through the gas lock valve 42 and is discharged into the imperforate portion 14 of the cylinder 10. The cylinder is rotated at a rate which causes the helix 28 to move the material the entire length of the cylinder in about 20 to 30 minutes. Hot flue gases at 400° F. enter the shell through the duct 30 and pass countercurrent to the chopped material advancing to the right end of the cylinder. The constant agitation of the material exposes all surface areas to the hot gas. Thus the temperature of the material rises rapidly without any danger of scorching. It will be noted that the cylinder is tilted so that the fat which separates from the fibrous and other solid material will flow through perforated wall 12 toward the left of the apparatus into the catch pan 44 and sump 66. This precludes any possibility of the fat being discharged into outlet conduit 46.

As pointed out above, it is desirable that the combustion gases be as free of oxygen as possible although where the time of exposure is short, the fat and the protein material is not appreciably damaged even though hot air is used as the source of heat. The rate of flow of the gas should be such that the solid rendered material or cracklings discharged from the right end of the cylinder into the conduit 46 attains a temperature of approximately 280°–290° F.

It will be appreciated that as the gas advances from the right to the left end of the cylinder, it becomes cooler. Consequently, the material first entering the cylinder is contacted with the lower temperature gas and as it passes toward the right end of the apparatus the temperature of the gas gradually increases. During this period the free water in the fat is removed or absorbed by the protein. The imperforate wall 14 prevents discharge of water into the sump 66. By the time the fatty material reaches the first part of the perforated portion 12 of the cylinder it has attained a temperature of 175–180° and some of the free melted fat begins to separate immediately through the perforations in the cylinder. Thus, the fat is not subjected to unnecessary heat. The residual material continues to flow countercurrent to the stream of hot air and its temperature is gradually raised to dry the material and insure melting all of the fact therein.

The solid denatured protein material which is discharged from the end of the cylinder 10 into the conduit 46 will contain some fat which adheres to the surface of the solid material. In order to recover this fat the solids are discharged through the conduit 48 to the floor 64 below, where they are conveyed on the conveyor 50 to the mechanical press 54. This remaining fat is then expressed from the solids in the press.

The hot gas stream has a drying effect on the solids passing through the cylinder. Some of the lighter denatured solids, as well as volalized moisture, will become entrained in the gas stream. These solids are valuable and it has been found economical to recover them. This is accomplished by passing the spent gas together with the entrained solids into the primary cyclone 56 where the solids fall to the bottom of the cyclone and the spent gas is exhausted through the duct 62. The lightweight solids are conveyed by means of a current of air to the second cyclone 58 where they are separated from that air and dropped onto the conveyor 50 together with the solids passing through the duct 48 as previously mentioned. The fat expressed from these solids and all of the fat which drains through the perforated wall or screen 12 of the cylinder is pumped into the grease settling tank 72.

The yield and analysis of the charge stock and products obtained from processing it in accordance with the foregoing specific example is set forth in the table below:

|  | Moisture, percent | Fat, percent | Protein, percent | Percentage of charge |
|---|---|---|---|---|
| Charge | 48.6 | 28.9 | 14.5 | 100 |
| Rendered Material Before Pressing | 3.9 | 28.02 | 40.4 | 54.2 |
| Pressed Cracklings | 4.4 | 9.7 | 51.6 | 42.5 |
| Rendered Fat: | | | | |
| Drained From Cylinder | 0.4 | 98.8 | 0.8 | 9.5 |
| Pressed Fat | 0.3 | 99.5 | 0.2 | 15.1 |

|  | Analysis of Fat | | |
|---|---|---|---|
|  | Drained Fat | Pressed Fat | Combined Fat After Settling |
| F.F.A. | 0.4 | 0.7 | |
| Color, FAC | 3 | 7 | |
| Moisture | | | 0.12 |
| Insoluble | | | 0.18 |
| Unsaponifiable | | | 0.63 |
| MIU | | | 0.93 |

Quality and yield of products approximate those of regular plant dry rendering.

Although the invention is unique in that inferior charge stock containing relatively small quantities of fat may be used, it will be understood that regular lard fat from bellies is also suitable as a charge stock. The fat recovered is of high quality, the process is fact and it may be carried out continuously. It is especially noteworthy that no scorching of the rendered material or the fat results from the direct contact of the inert gas although the temperature is high relative to prior rendering processes. Care must be taken, however, to move the material through the cylinder at a rate which prevents the denatured rendered protein from becoming hotter than 300° F. Of course, the temperature of the gas can be reduced, but this increases the time of exposure.

From the foregoing description it is apparent that the apparatus of the invention is relatively low in cost, rugged in construction and economical to operate. No precision equipment is required.

Variations in the process will occur to those skilled in the art and it is our intention to include such within the scope of the appended claims.

We claim:

1. A continuous process for rendering fatty material which comprises grinding said material, advancing the ground material countercurrent to a stream of hot non-condensable combustion gas while constantly agitating the material, said material being in contact with said gas for a time sufficient to dry said material, melt the fat and denature the protein therein, said stream flowing at a rate sufficient to entrain dry lightweight solid components of said material, removing said lightweight components from said stream, separating said fat from the rendered solids, and combining the rendered solids and said lightweight components to form a mixture and pressing said mixture to extract the remaining fat.

2. A process for rendering fatty material which comprises grinding the material into small pieces, agitating the ground material while passing a stream of hot combustion gas over the surface thereof, the temperature of the gas being sufficiently high to denature the protein in said material thereby drying the material by entrainment of moisture in said stream and raising the temperature to the melting point of the fat therein using said combustion gas as the sole source of heat, and separating the fat from the rendered material as it becomes molten.

3. A continuous process for rendering particulate fatty material which comprises providing a rotating cylinder having a perforated side wall, advancing said material through said cylinder while passing a stream of combustion gas at a temperature of about 400° F. countercurrent thereto to dry the material and melt the fat therein, the rate of flow of said material and said gas being such that the temperature of said material attains a maximum temperature of 280–290° F., collecting the fat which flows through said perforated wall, removing the rendered solids from the end of said cylinder and subjecting said solids to mechanical pressing to extract fat remaining therein.

References Cited by the Examiner

UNITED STATES PATENTS

| 434,696 | 8/90 | Binder | 260—412.6 |
| 1,845,893 | 2/32 | Sommermeyer | 260—412.6 |
| 1,930,091 | 10/33 | Halvorson et al. | 260—412.6 |
| 2,467,529 | 4/49 | Hormel | 260—412.6 |
| 2,551,042 | 5/51 | Nyrop | 23—280 |
| 2,673,790 | 3/54 | Illsley | 23—280 |
| 2,697,112 | 12/54 | Kramer | 260—412.6 |
| 2,742,488 | 4/56 | Dufoult | 260—412.6 |
| 2,820,804 | 1/58 | Gordon | 260—412.6 |

CHARLES B. PARKER, *Primary Examiner.*

ABRAHAM H. WINKELSTEIN, IRVING MARCUS, *Examiners.*